United States Patent
Ott et al.

(10) Patent No.: US 7,654,359 B2
(45) Date of Patent: Feb. 2, 2010

(54) TRACTOR CONTROL MEANS

(75) Inventors: Max Ott, Marktoberdorf (DE); Johann Epple, Marktoberdorf (DE)

(73) Assignee: AGCO GmbH, Marktoberdorf (DE)

( * ) Notice: Subject to any disclaimer, the term of this patent is extended or adjusted under 35 U.S.C. 154(b) by 53 days.

(21) Appl. No.: 11/678,295

(22) Filed: Feb. 23, 2007

(65) Prior Publication Data

US 2007/0199398 A1 Aug. 30, 2007

(30) Foreign Application Priority Data

Feb. 24, 2006 (DE) .................. 20 2006 002 969 U

(51) Int. Cl.
*B60K 26/00* (2006.01)
(52) U.S. Cl. .............................. 180/333; 172/2; 74/471
(58) Field of Classification Search ................. 180/333, 180/315; 172/2, 3; 74/471
See application file for complete search history.

(56) References Cited

U.S. PATENT DOCUMENTS

| | | | |
|---|---|---|---|
| 5,396,222 A | 3/1995 | Kus et al. | |
| 5,550,539 A * | 8/1996 | Miki et al. | 341/20 |
| 5,937,897 A * | 8/1999 | Chatterjea et al. | 137/554 |
| 6,281,881 B1 * | 8/2001 | Siddiqui et al. | 345/164 |
| 6,348,912 B1 * | 2/2002 | Smith | 345/163 |
| 6,435,289 B1 * | 8/2002 | Hori et al. | 180/6.3 |
| 6,456,275 B1 * | 9/2002 | Hinckley et al. | 345/156 |
| 6,590,171 B1 | 7/2003 | Wolf et al. | |
| 6,590,564 B1 * | 7/2003 | McLoone et al. | 345/167 |
| 6,593,667 B1 * | 7/2003 | Onodera et al. | 307/10.1 |
| 6,601,670 B2 * | 8/2003 | Kaneda et al. | 180/333 |
| 6,694,236 B2 * | 2/2004 | Onodera | 701/36 |
| 6,707,387 B2 * | 3/2004 | Noguchi et al. | 340/691.6 |
| 6,741,233 B1 * | 5/2004 | Swan et al. | 345/161 |

(Continued)

FOREIGN PATENT DOCUMENTS

DE 8905298 6/1989

(Continued)

OTHER PUBLICATIONS

Search Report for Related European Application No. EP07003389 dated Jul. 17, 2007.
AGCO GmbH Brochure, Oct. 2005.

*Primary Examiner*—Toan C To

(57) ABSTRACT

A control means for an agricultural tractor is disclosed which has a switching element carrier arranged in proximity to the leading end region of an arm rest of a driver's seat. The control means has a large number of switches for controlling various vehicle units and the carrier has a hand rest (3, 4) provided with a spherical surface for the palm of the vehicle driver's hand. An adjustment wheel (14, 19) is provided for controlling a switching element (12, 24), the adjustment wheel having a setting rim (14a, 19a) which extends from the switching element carrier in a region which can be reached by the fingers of the hand resting on the hand rest (3, 4). Preferably the control means is provided with two adjustment wheels (14, 19) one above the other, each adjustment wheel having a setting rim (14a,19a) which can be reached by the fingers of a hand resting on the hand rest. These adjustment wheels (14, 19) preferably have actuating shafts (13, 23) which extend substantially coaxially and the lower adjustment wheel (14) has a larger external diameter than the upper adjustment wheel (19).

10 Claims, 2 Drawing Sheets

U.S. PATENT DOCUMENTS

| | | | |
|---|---|---|---|
| 6,971,194 B2 * | 12/2005 | McClelland et al. | 37/347 |
| 7,084,856 B2 * | 8/2006 | Huppi | 345/163 |
| 7,293,625 B2 * | 11/2007 | Kumazawa | 180/333 |
| 2002/0075233 A1 * | 6/2002 | White et al. | 345/161 |
| 2002/0157498 A1 | 10/2002 | Black | |
| 2003/0076303 A1 * | 4/2003 | Huppi | 345/163 |
| 2004/0085295 A1 * | 5/2004 | Cowen | 345/161 |
| 2007/0279381 A1 * | 12/2007 | Odell et al. | 345/163 |

FOREIGN PATENT DOCUMENTS

| | | |
|---|---|---|
| DE | 19642994 | 4/1998 |
| DE | 19934186 | 1/2001 |
| DE | 202006002969 | 6/2006 |

* cited by examiner

TRACTOR CONTROL MEANS

BACKGROUND OF THE INVENTION

1. Field of the Invention

The invention relates to a control means for utility vehicles, in particular for tractors usable for agricultural purposes, having a switching element carrier, arranged in proximity to the leading end region of an arm rest of the driver's seat, for a group of switching elements comprising a large number of switches for controlling various vehicle units, which carrier has a hand rest provided with a spherical surface for the palm of the vehicle driver's hand.

2. Description of Related Art

Control means of this type are intended not only to make the vehicle easier to operate for the driver of the vehicle but also to offer him effective driving comfort, his arm and hand being in a relaxed position, with a large number of actuating elements, such as pushbuttons and switches, provided for the actuation of various vehicle units, arranged so as to be as ergonomically advantageous as possible.

A control means meeting these requirements to a high degree is described in EP 0 813 993 B1. This document discloses a switching element carrier having a spherically shaped hand rest carrying a large number of actuating elements. These are basically pushbuttons or rocker switches for the rapid raising of a front tool carried by the front hoisting gear, the interruption of all functions and the rapid raising of a rear mounted implement carried by the rear hoisting gear. It should be noted in this regard that the rocker switches for the rapid removal of the front and rear mounted implements are also used for controlling the lowering thereof into the working position. This document does not refer to a console which is arranged next to the arm rest on the side wall of the driver's cabin and carries further actuating elements. These further actuating elements include two actuating elements for the setting or adjusting of the desired values of the front and rear hoisting gears, i.e. for inputting the desired working position of the tools. This known arrangement forces the driver, whenever a change in the working position is desirable or necessary, to release his hand from the hand rest and to swivel his right forearm to the console in order to reach the actuating elements. Once the respective actuating element has been set, the driver has to pivot back his forearm before he can place his hand on the hand rest and optionally actuate the pushbutton for the rapid raising of the front or rear mounted implement.

Starting from this, the object of the invention is to improve a control means of the type described at the outset by increasing the degree of operational and driving comfort for the driver.

BRIEF SUMMARY OF THE INVENTION

Thus in accordance with the invention, in order to meet this requirement, an adjustment wheel for controlling a switching element is mounted in the switching element carrier, the edge of the adjustment wheel has a setting rim which extends from the switching element carrier in a region which can be reached by the fingers of the hand resting on the hand rest. This allows the driver's forearm to remain on the arm rest, so it does not have to be laterally swivelled.

In a preferred arrangement two adjustment wheels are provided one above the other, each adjustment wheel having a setting rim which can be reached by the fingers.

If the axes of the adjustment wheels extend substantially coaxially and the lower adjustment wheel has a greater external diameter than the upper adjustment wheel, the adjustment wheels can easily be reached and rotated by the driver's fingers, thus ruling out accidental adjustment of the upper adjustment wheel in the event of adjustment of the lower adjustment wheel. In addition, accidental adjustment of the adjustment wheels can be prevented in that the adjustment wheels and marker rings associated with the or each adjustment wheel cooperate with the carrier via friction linings. The friction linings can, for this purpose, easily be in the form of friction rings mounted on the adjustment wheels, the carrier and/or the marker rings.

The diameter of the lower adjustment wheel, which is larger than that of the upper adjustment wheel, further produces the advantage that the upwardly pointing faces of intermediate base plates of the carrier can each be provided in their outer edge region with a scale which facilitates the adjustment and recovery of a specific desired value.

As far as the switching elements, for example potentiometers, coupled to the adjustment wheels are concerned, simple assembly thereof is provided if they are fastened to the hand rest or an intermediate base plate of the carrier one above the upper adjustment wheel and one below the lower adjustment wheel. In this case, it is easily possible, using centring pins, to centre on an intermediate base plate and hold without play the adjustment wheels provided with central through-holes.

In order to adapt the relative position of the hand rest as effectively as possible to the natural position of the driver's hand, the switching element carrier has a base housing part provided with a base face which encloses an angle with the axes of the switching elements and receives, within the grasp of the fingers of a hand resting on the hand rest, a plurality of pushbuttons, preferably five pushbuttons, for controlling various units of the vehicle.

BRIEF DESCRIPTION OF DRAWINGS

An embodiment of the invention will be described hereinafter in greater detail with reference to the drawings, in which.

DETAILED DESCRIPTION OF PREFERRED EMBODIMENTS

Figure 1:
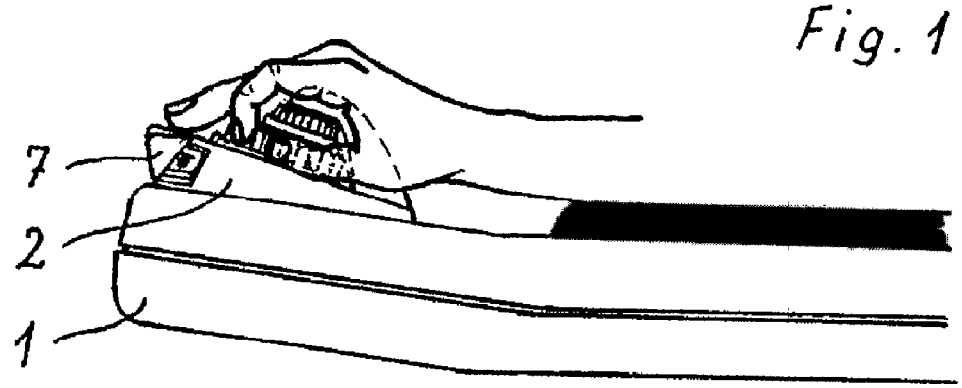
FIG. 1 shows a switching element carrier arranged on a mount.
Figure 2:
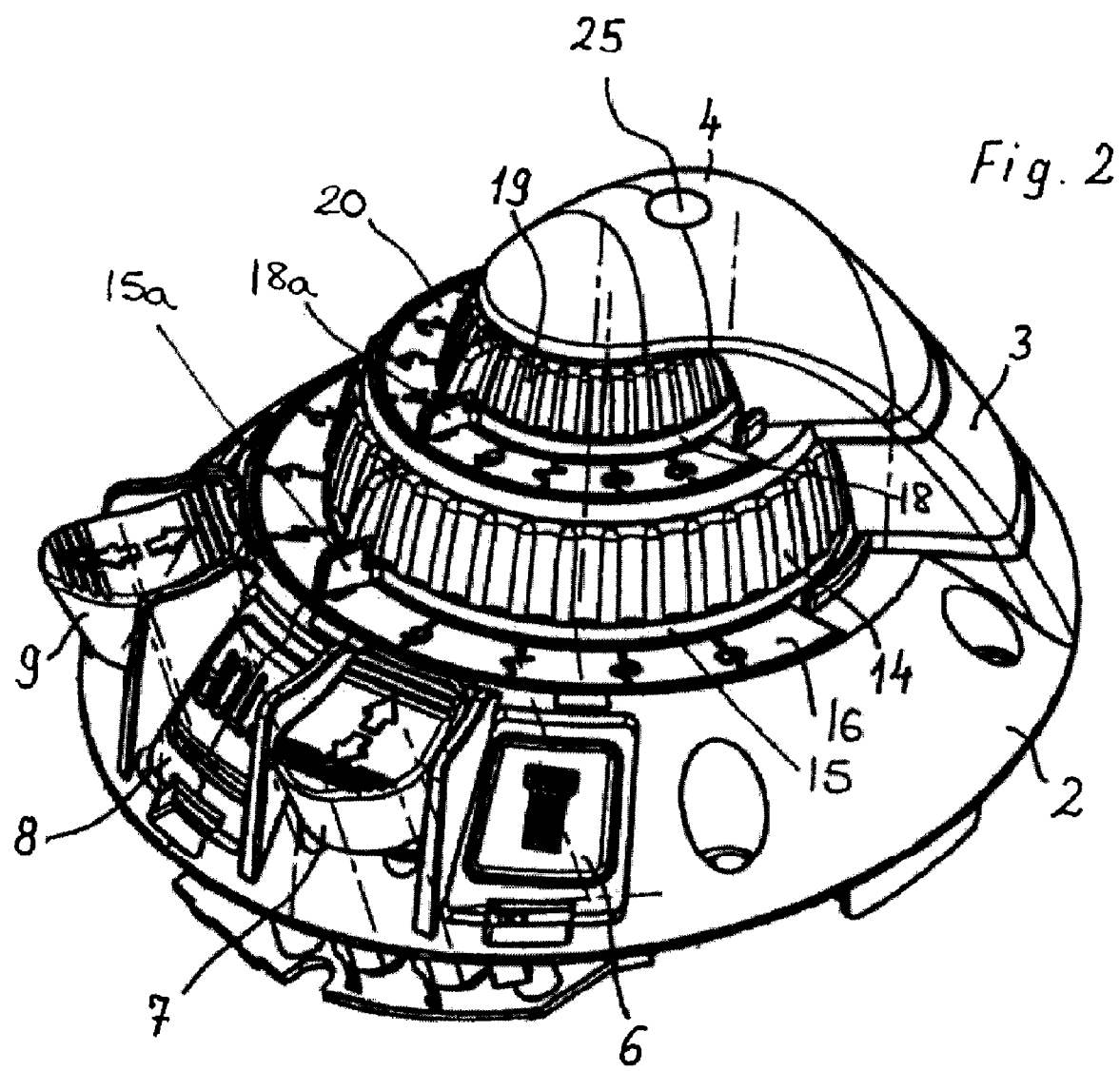
FIG. 2 is a perspective view of the switching element carrier.
Figure 3:
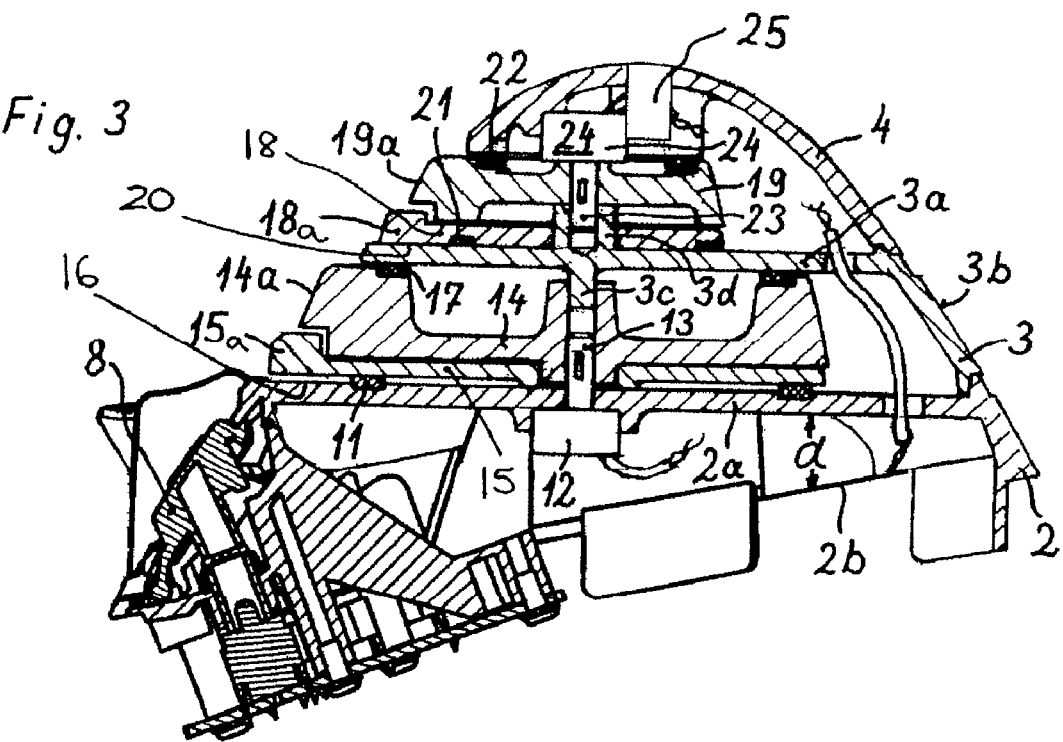
FIG. 3 is a sectional view of the switching element carrier, taken along the line A-B in FIG. 4.
Figure 4:
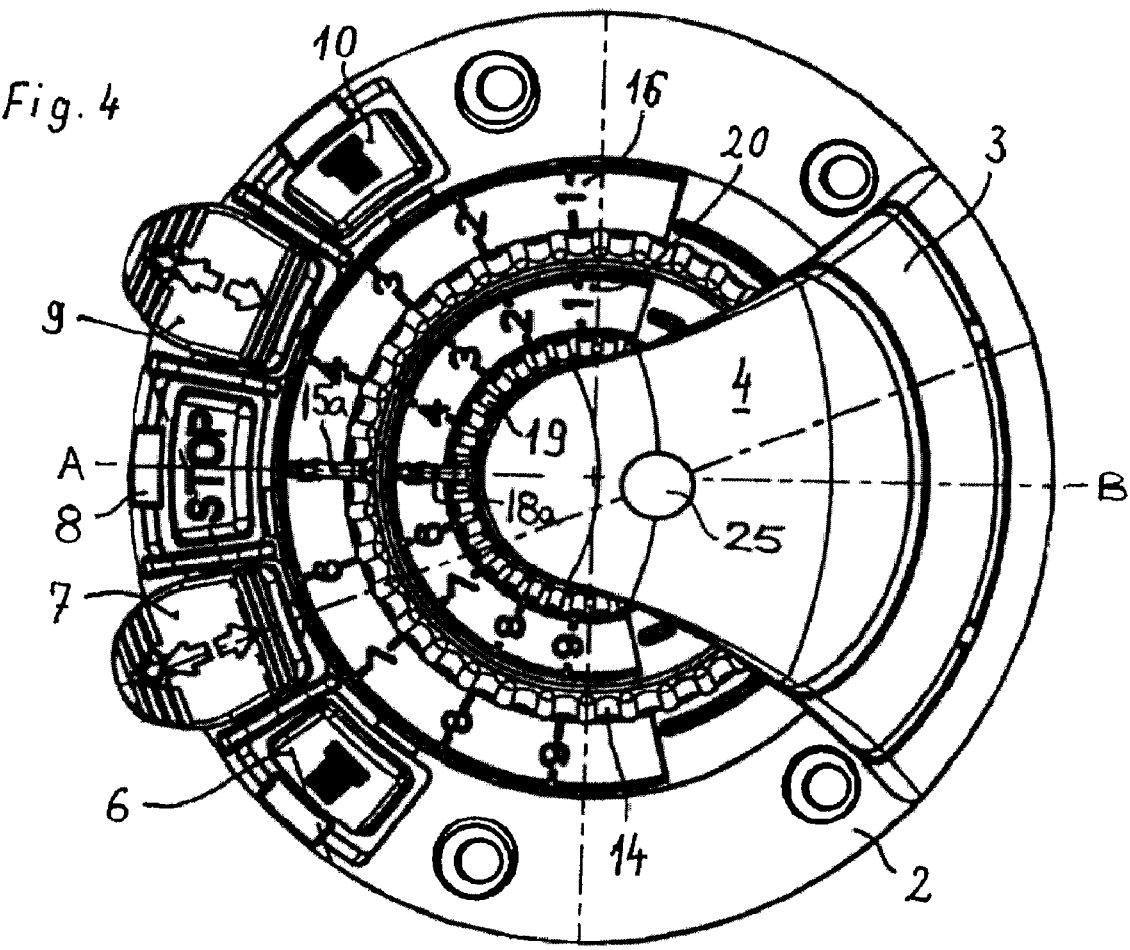
FIG. 4 is a view from above of the switching element carrier.

The switching element carrier shown in the figures is fastened to the arm rest 1 of a tractor seat the front portion of which rises upwards slightly. The switching element carrier consists of a lower housing part 2, a central housing part 3 and an upper housing part 4. The lower, substantially truncated housing part 2—also referred to as the base housing part—carries five switching elements 6, 7, 8, 9, 10 which can be in the form of pushbuttons or rocker switches. The switching elements are used for controlling the front power take-off, for the rapid raising of the front hoisting gear, for stopping all functions, for the rapid raising of the rear hoisting gear and for controlling the rear power take-off respectively.

The lower housing part 2 is upwardly delimited by an intermediate base plate 2*a*. In order to adapt the position of the switching element carrier as closely as possible to the natural position of the driver's hand, the lower housing part 2 is provided with a base face 2*b* which encloses a sufficiently large angle α with the intermediate base plate 2*a*. The intermediate base plate 2*a* has a central through-hole and, on the upwardly pointing face, an annular groove which is coaxial therewith and contains an annular friction lining 11. Fastened to the underside of the intermediate base plate 2*a* is a potentiometer 12, the actuating shaft 13 of which is guided through the through-hole and non-rotatably received by a central through-hole in an adjustment wheel 14. A marker ring 15, having a marker tab 15*a* which is independently rotatable relative to adjacent adjustment wheel 14 and can be set to mark a specific rotational position of the adjustment wheel 14, is provided so that the marker position can be subsequently resumed. Ring 15 is centred below the adjustment wheel 14, on its hub. In order to prevent the marker ring 15 from being adjusted accidentally during harsh operation, the marker ring 15 abuts the friction lining 11 with slight biasing.

The adjustment wheel 14 is provided with a truncated setting rim 14*a* having a slip-proof outer surface. Its external diameter is smaller than the diameter of the intermediate base plate 2*a*, so that an outer edge region of the intermediate base plate 2*a* remains visible around the setting rim 14*a*. The edge region of the plate 2*a* is provided with a scale 16 which facilitates the setting of the desired value of the height of a rear mounted implement using wheel 14.

Attached to the lower housing part 2 is the central housing part 3 which continues, on the side of the carrier opposite to the switching elements 6 to 10, the truncated form of the lower housing part 2 and has an upper intermediate base plate 3*a* closely spanning the adjustment wheel 14. However, the outer surface 3*b* of this housing part 3 extends circumferentially for less than 180°, so that a large portion of the circumference of the adjustment wheel 14 is accessible for manual adjustment. Two pins 3*c*, 3*d* are formed integrally on the top and bottom of the intermediate base plate 3*a*. The lower pin 3*c* engages, so as to ensure guidance of the adjustment wheel 14 without play, in the through-hole in said adjustment wheel. In order to prevent the adjustment wheel 14 also from being accidentally adjusted during harsh operation, said adjustment wheel is provided with a friction lining 17 which abuts the intermediate base plate 3*a* with slight biasing.

The upper pin 3*d* is used for centring a marker ring 18 with a marker tab 18*a* which is associated with a further adjustment wheel 19 which has a setting rim 19*a* and is located above the intermediate base plate 3*a*. This adjustment wheel 19 is substantially of the same construction as the adjustment wheel 14, only its external diameter being smaller so as to allow both adjustment wheels and the switching elements 6 to 10 to be reached and actuated without difficulty. In this case, too, there remains visible an outer edge region of the intermediate base plate 3*a* which is provided with a scale 20 facilitating setting of the desired value of a front mounted implement. Moreover, the marker ring 18 and the adjustment wheel 19 are also protected from accidental adjustment using friction linings 21, 22 abutting the intermediate base plate 3*a* and the housing part 4 respectively.

The adjustment wheel 19 is connected to a potentiometer 24 via an actuating shaft 23 mounted in the pin 3*d*. The potentiometer is fastened to the inside of an upper housing part 4 which, together with the outer surfaces of the central and lower housing parts 2, 3, forms a spherically shaped hand rest at least in the upper portion. So as to allow a large portion of the circumference of the upper adjustment wheel 19 to be accessible for adjustment, the lateral extent of the upper housing part 4 decreases upwardly, starting from the lateral extent of the outer surface of the central housing portion 3 up to almost the external diameter of the adjustment wheel 19, thereby spanning said adjustment wheel in the manner of a dome.

The Control means is additionally provided with a hand rest sensor 25 for detecting whether operator's hand is placed on the upper housing part 4. The sensor is installed inside the housing part 4 beneath the highest extent of the hand rest area and the sensing head penetrates the top wall of the upper housing part 4 and must be sealed towards the housing parts to avoid water or dirt impact on any inside parts.

The hand rest sensor 25 can work according different principles to detect the hand, For example, the sensor may sence the presence of the hand by sensing:

heat received from the hand by an infrared sensor;

the changes in magnetic field experienced by a magnetic sensor, and the changes in light level detected by a photocell sensor.

If the hand rest sensor 25 detects that the operator's hand is on the hand rest the following functions, represented by buttons, can be activated (depending on the tractor configuration):

Buttons 6, 10 for operating the front and rear PTO

Buttons 7,9 for operating the rear and front lifting unit

The other control elements 8 (which stops all functions) and 14, 19 (which change the setpoints for the lifting units) can be activated without positive recognition of the presence of a hand by the sensor 25.

Although in the arrangement described above the control means includes two adjustment wheels 14 and 19, only one adjustment wheel and associated marker ring and scale may be used in some installations.

We claim:

1. A control means for utility vehicles, in particular for tractors usable for agricultural purposes, having a switching element carrier, arranged in proximity to a leading end region of an arm rest of the driver's seat, for a group of switching elements comprising a large number of switches for controlling various vehicle units, the carrier having a hand rest (3,4) provided with a spherical surface for the palm of the vehicle driver's hand and a sensor (25) to detect the presence of the vehicle driver's hand, and two adjustment wheels (14, 19) being provided one above the other for controlling a switching element (12, 24), each adjustment wheel having a setting rim (14*a*, 19*a*) which extends from the switching element carrier in a region which can be reached by the fingers of the hand resting on the hand rest (3, 4), in which two adjustment wheels (14,19) are provided one above the other, each adjustment wheel having a setting rim (14*a*,19*a*) which can be reached by the fingers.

2. A control means according to claim 1 in which the adjustment wheels (14, 19) have actuating shafts (13, 23) which extend substantially coaxially and the lower adjustment wheel (14) has a larger external diameter than the upper adjustment wheel (19).

3. A control means according to claim 1 wherein one or both adjustment wheels (14, 19) have a marker ring (15, 18) associated therewith, each adjustment wheel (14, 19) or marker ring (15, 18) cooperating with the carrier via friction linings (11, 17, 21).

4. A control means according to claim 3 in which the friction linings (11, 17, 21) are in the form of friction rings mounted on the adjustment wheels (14, 19), the carrier (2*a*, 3*a*) and/or the marker rings (15, 18).

5. A control means according to claim 3 in which one or more upwardly pointing faces of intermediate base plates (2*a*, 3*a*) of the carrier are each provided in their outer edge region with a scale (16, 20).

6. A control means according to claim 1 wherein the switching elements (12, 24) are fastened one (24) above the upper adjustment wheel (19) and one (12) below the lower adjustment wheel (14).

7. A control means according to claim 1 wherein the switching element carrier has a base housing part (2) provided with a base face (2*b*) which encloses an angle ($\alpha$) with an intermediate base plate (2*a*) and receives, within the grasp of the fingers of a hand resting on the hand rest (3, 4), a plurality of pushbuttons (6, 7, 8, 9, 10), for controlling various units of the vehicle.

8. A control means according to claim 1, wherein the sensor (25) is of the infrared, the magnetic or the photocell.

9. A control means according to claim 1, wherein the switches (6, 7, 9, 10) of certain vehicle units are only operative when the sensor detects the presence of the driver's hand.

10. A control means according to claim 9, wherein a stop control (8) is provided which stops operation of all vehicle units and which can be operated whether or not the sensor (25) detects a hand on the hand rest (3, 4).

* * * * *